Examiner
54
BEST AVAILABLE COPY
54/54
*James W. Smith. Combined Grist Mill & Cotton Seed Huller.*
4446
REISSUED JUN 27 1871
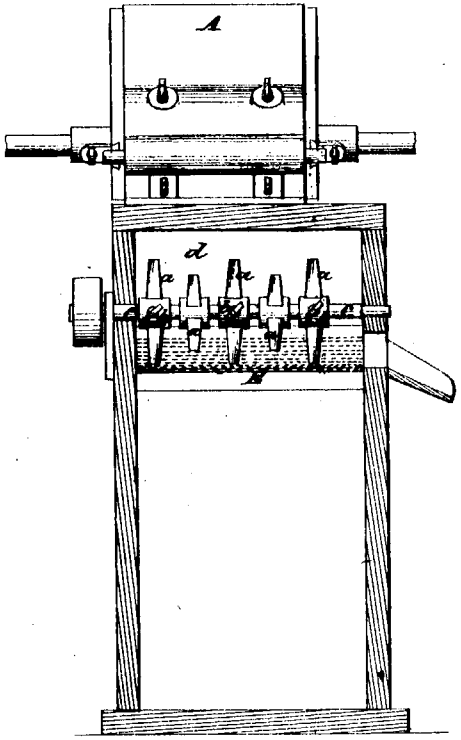
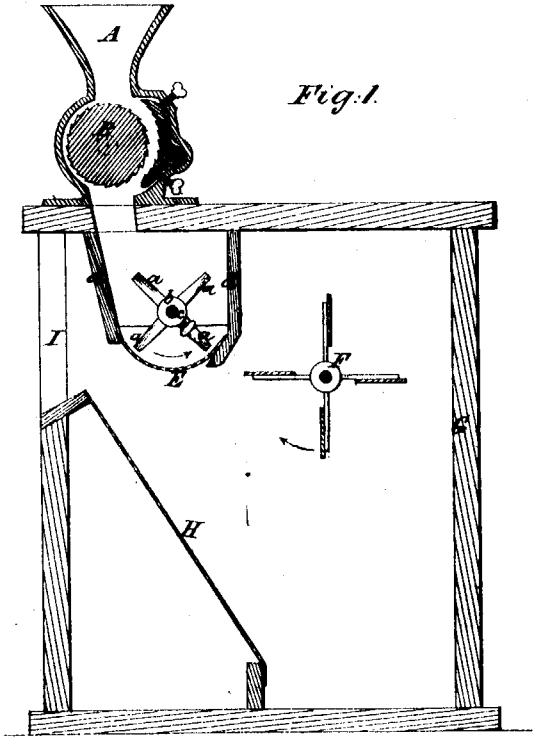
Witnesses:
M. Ely.
Henry F. Brown
James W. Smith
AM. PHOTO-LITHOGRAPHIC CO. N.Y. (OSB' ' 'S PROCESS.)

OR DISINTEGRATION

60

UNITED STATES PATENT OFFICE.

JAMES W. SMITH, OF COLUMBUS, GEORGIA.

IMPROVEMENT IN COMBINED GRIST-MILLS AND COTTON-SEED HULLERS.

Specification forming part of Letters Patent No. 114,215, dated April 25, 1871; reissue No. 4,446, dated June 27, 1871.

*To all whom it may concern:*

Be it known that I, JAMES W. SMITH, of Columbus, in the county of Muscogee and State of Georgia, have invented a new and Improved Combined Grist-Mill and Cotton-Seed Huller; and I do hereby declare that the following is a full, clear, and exact description of the same, reference being had to the accompanying drawing forming part of this specification.

My invention consists in the combination with a grist-mill, whose grinding devices are a rotating toothed cylinder and a toothed concave plate or bed, of an agitator, a separator, and a fan-blower, whereby such a mill is adapted to the hulling of cotton-seed.

The grist-mill which I will select for the purpose of explaining my invention is that which is the subject of Letters Patent No. 81,725, issued to George N. Annan September 1, 1868, and such a mill is represented in the accompanying drawing, in which—

Figure 1 is a vertical section of the combined grist-mill and cotton-seed huller in a plane parallel with the planes of rotation of the cylinder, agitator, and separator. Fig. 2 is a vertical section taken at right angles to Fig. 1, directly through the separator.

Similar letters of reference indicate corresponding parts in both figures.

To adapt the grist-mill to the hulling of cotton-seed, all the change that I make in the mill itself is by widening the throat of the receiver A so as to allow cotton-seeds in the hull, which are of greater bulk than corn, to feed freely to the crushing-cylinder B and concave plate or bed C, and by making the teeth of said cylinder and plate or bed more hook-shaped and longer in cross-section, so as to enable them to seize and draw down the cotton-seed, which are lighter than corn, and, when in the hull, not so easy to be caught by the teeth. The mill is arranged on the top of a case, G, near one end thereof, as shown in Fig. 1, and toward one side thereof, as shown in Fig. 2, so that its outlet communicates with said case. In the upper part of this case, a little behind the cylinder B, is arranged the agitator, consisting of a number of screw-blades, *a a*, radiating from hubs *b*, which are secured upon a horizontal shaft, *c*, by means of set-screws, so as to be adjustable, the adjustment being such that the blades are in spiral rows lengthwise of the shaft. The shaft is arranged parallel with the cylinder A, in bearings at the sides of the case, between partitions *d d*, which inclose it at the sides, and to the lower parts of these partitions is connected the separator E, which should be removable, consisting of a concave screen, the meshes of which are large enough for the kernels of the seed to pass through, but not large enough for the passage of the hulls and their adhering fiber. From this separator there is an outlet through the side of the case. Below and some distance to the rear of the agitator and separator, and within the case G, is the rotary fan-blower F, whose shaft, arranged parallel with that of the agitator, is supported in bearings at the sides of the case G. Under the separator is arranged an inclined stationary screen, H, and above this screen there is an opening, I, in the front of the case G.

Rotary motion being given to the cylinder B, the agitator, and the fan-blower, by belts and pulleys or other means, the hulls of the cotton-seed are cracked between the said cylinder and the plate or bed C, and the kernels and hulls fall together into the separator E, wherein they are stirred up or agitated by the blades *a a*, which disengage the kernels from the hulls, cause the former to drop through the separator, and, by reason of their spiral arrangement, draw the hulls and their adhering fiber to one end of the separator, whence they pass out through the opening in the case, while the kernels drop from the separator upon the inclined screen H, from which the greater part of them slide down to the foot, the finer portions passing through it. The blast from the fan-blower winnows the kernels as they fall from the separator and drive the dirt, dust, and motes off through the opening I in the case.

When the mill is used for grinding corn, the agitator and fan are rendered inoperative by unshipping their driving-belts or otherwise throwing them out of gear, and the separator is removed so as to allow the meal and hominy to fall directly upon the screen H, through which the meal passes, and down which the hominy slides.

I do not claim the mill herein described.

What I claim as my invention, and desire to secure by Letters Patent, is—

The combination of an agitator, *a b c*, separator E, and fan F, when arranged for operation, as herein described, in connection with a grist-mill, substantially as herein specified.

JAMES W. SMITH.

Witnesses:

JAS. N. TOWNSEND,

W. N. ELY.